US006893006B2

(12) United States Patent
Drake, III

(10) Patent No.: US 6,893,006 B2
(45) Date of Patent: May 17, 2005

(54) MULTI-SPEED DROP LEG MECHANICAL JACK FOR USE WITH A TRAILER

(75) Inventor: Frank J. Drake, III, Wausau, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 10/368,519

(22) Filed: Feb. 18, 2003

(65) Prior Publication Data

US 2004/0159827 A1 Aug. 19, 2004

(51) Int. Cl.[7] .................................................. B60S 9/02
(52) U.S. Cl. ..................................... 254/425; 254/419
(58) Field of Search ............................... 254/419–425, 254/13; 280/6, 155, 766.1

(56) References Cited

U.S. PATENT DOCUMENTS

| | | | |
|---|---|---|---|
| 2,232,187 A | | 2/1941 | Reid .......................... 280/33.1 |
| 2,464,890 A | | 3/1949 | Premo ......................... 74/750 |
| 3,135,135 A | | 6/1964 | Dalton ......................... 74/781 |
| 3,259,364 A | | 7/1966 | Hulverson et al. ............. 254/86 |
| 4,082,249 A | * | 4/1978 | Valdespino et al. ........... 254/45 |
| 4,187,733 A | | 2/1980 | Walther et al. ............... 74/342 |
| 4,205,824 A | | 6/1980 | Mai ............................. 254/86 |
| 4,462,612 A | | 7/1984 | Dreyer et al. ............. 280/766.1 |
| 4,634,144 A | | 1/1987 | Ringe ...................... 280/763.1 |
| 4,824,136 A | | 4/1989 | Baxter ......................... 280/475 |
| 4,903,977 A | | 2/1990 | Baxter ......................... 280/475 |
| 4,923,175 A | | 5/1990 | Bentrup ...................... 254/419 |
| 5,199,738 A | | 4/1993 | VanDenberg ............. 280/766.1 |
| 5,238,266 A | | 8/1993 | VanDenberg ............. 280/766.1 |
| 5,423,518 A | * | 6/1995 | Baxter et al. ............... 254/419 |
| 5,538,225 A | * | 7/1996 | VanDenberg ............... 254/419 |
| 5,542,647 A | | 8/1996 | Huetsch ...................... 254/420 |
| 5,676,018 A | | 10/1997 | VanDenberg ................. 74/373 |
| 6,099,016 A | | 8/2000 | Peveler ........................ 280/475 |
| 6,261,199 B1 | * | 7/2001 | Schlangen ................... 475/163 |
| 6,598,886 B2 | * | 7/2003 | Baird et al. .............. 280/6.155 |
| 2001/0052592 A1 | * | 12/2001 | Alvarado ...................... 254/13 |
| 2003/0036455 A1 | * | 2/2003 | Ushikoshi ................... 475/331 |

OTHER PUBLICATIONS

JOST Landing Gear, A400 & A401 Telescopic Landing Gear Operating, Maintenance and Repair Instructions, May, 1998.
The Holland Group, Inc., FG4000 Series Landing Gear, http://www.hollandhitch.com/HollandBinklandingGear&JackSupports/FG4000Series.htm.

(Continued)

Primary Examiner—Lee D. Wilson
(74) Attorney, Agent, or Firm—Robert H. Earp, III; McDonald Hopkins Co., LPA

(57) ABSTRACT

A mechanical jack that is used with trailers that has a functional combination of several working gears as well as a drop leg feature is disclosed. The mechanical jack has a gearbox having gears that not only have the capacity to handle a relatively heavy load, but also have the ability to handle small and midsize loads while maintaining sufficient and commercially acceptable cranking speeds without excessive force required. The jack includes a crank or handle for use with the mechanical jack that assists in both effective raising and lowering of the jack, as well as efficient transition from one working gear to another. The crank provides an efficient way to change from one operating gear of the jack to another, and facilitates operator use of the mechanical jack to which it is connected, in order to provide improved cranking and improved changing of one operating gear to another. The invention facilitates multiple working speeds and a drop leg speed to create a commercially valuable selection of working gear ratios and mechanical jack load capacities in a trailer (e.g., gooseneck, flatbed, etc.) operating environment.

21 Claims, 5 Drawing Sheets

OTHER PUBLICATIONS

Kysor/Westran, Fastgear Landing Gear, FG4000 Series brochure.
The Holland Group, Inc., Formula 150 Landing Gears brochure.
Eagle Landing Gear, landing gear brochure.
The Binkley Company, Contender Model brochure, Form 141.
Holland Hitch Company, Mark V Setting New Standards for Landing Gear, Jan. 1995.
The Binkley Company, New FG4000 FastGear brochure, Form 155.
The Binkley Company, Dual–Pin Drop Legs with User–Friendly Retractable Leg Design brochure, Form 157.
The Binkley Company, Gooseneck Jacks brochure.
Holland—50000 Series Landing Gear, http://www.holland-hitch.com/HollandBinkl . . . LandingGear&JackSupports/50000Series.htm.
The Holland Group, Inc., Contender Landing Gear 51000 Series brochure.
Holland—51000 Series Landing Gear, http://www.holland-hitch.com/HollandBinkl . . . LandingGear&JackSupports/50000Series.htm.
The Holland Group, Inc., Holland—Drop Leg Jack Supports Models 48000, 49000 & 51000 Performance Specs & Selection chart.
The Holland Group, Inc., JS–300 Series Dolly Jacks brochure.

* cited by examiner

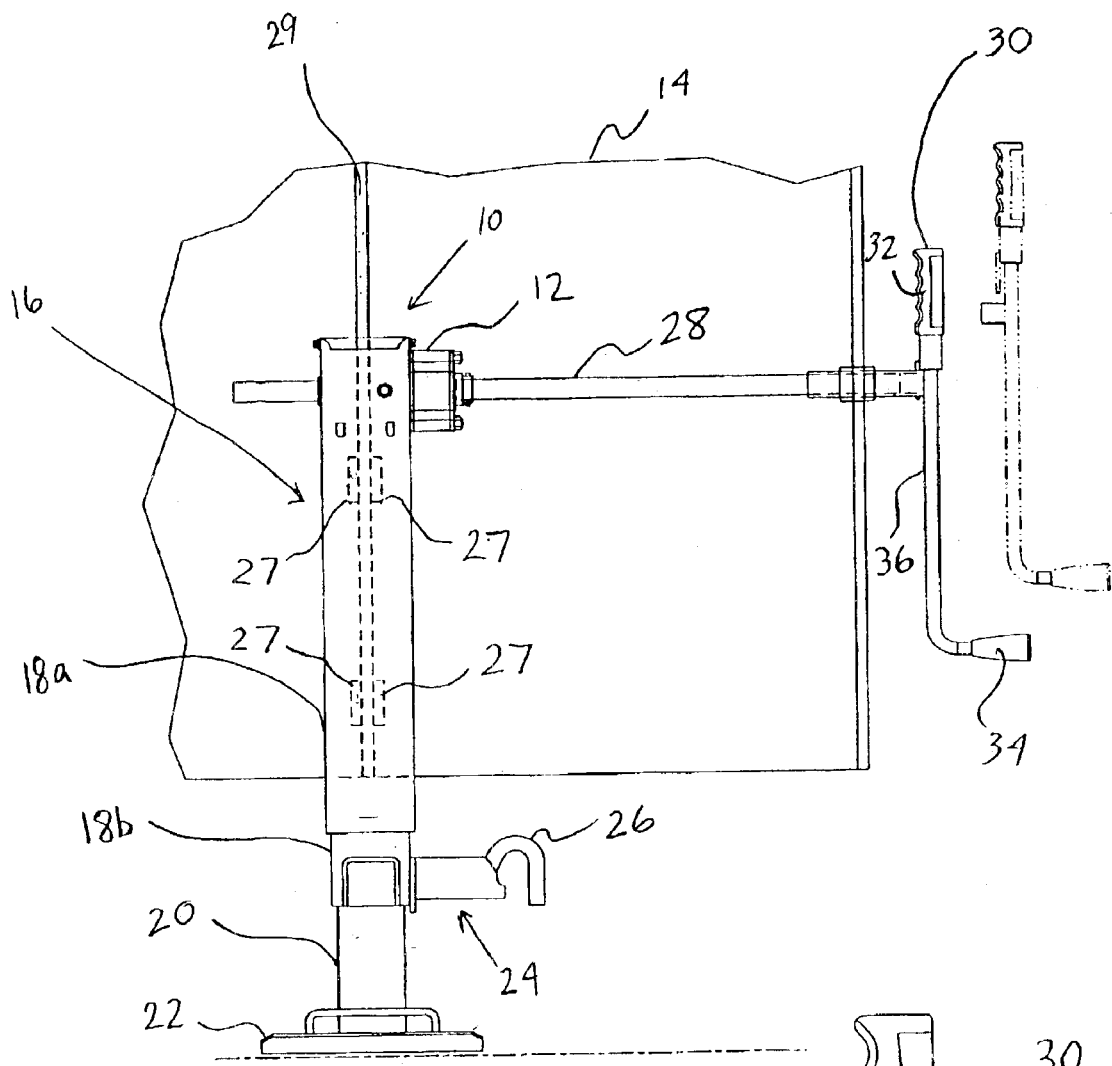
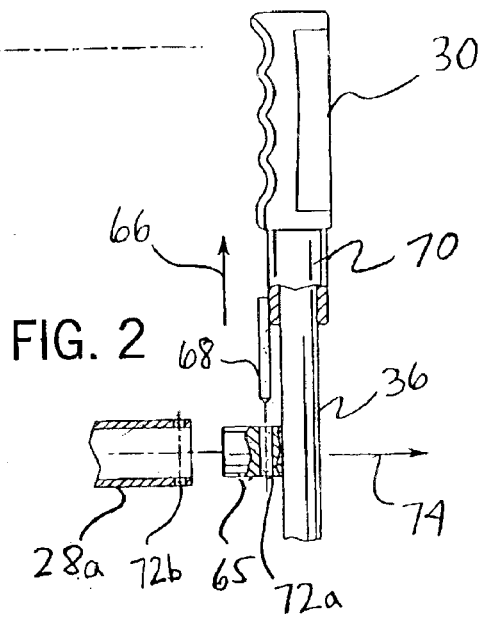
FIG. 1
FIG. 2

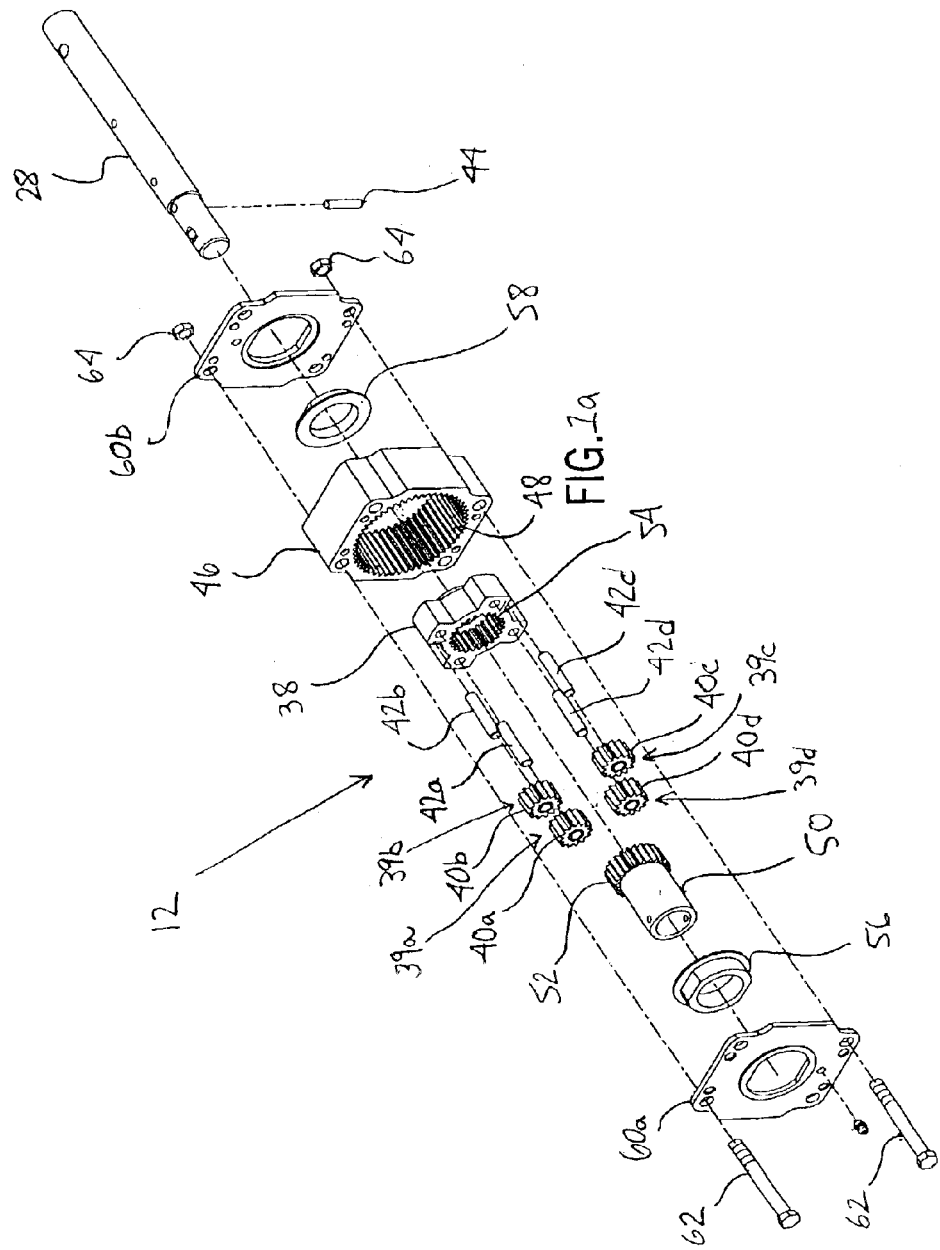

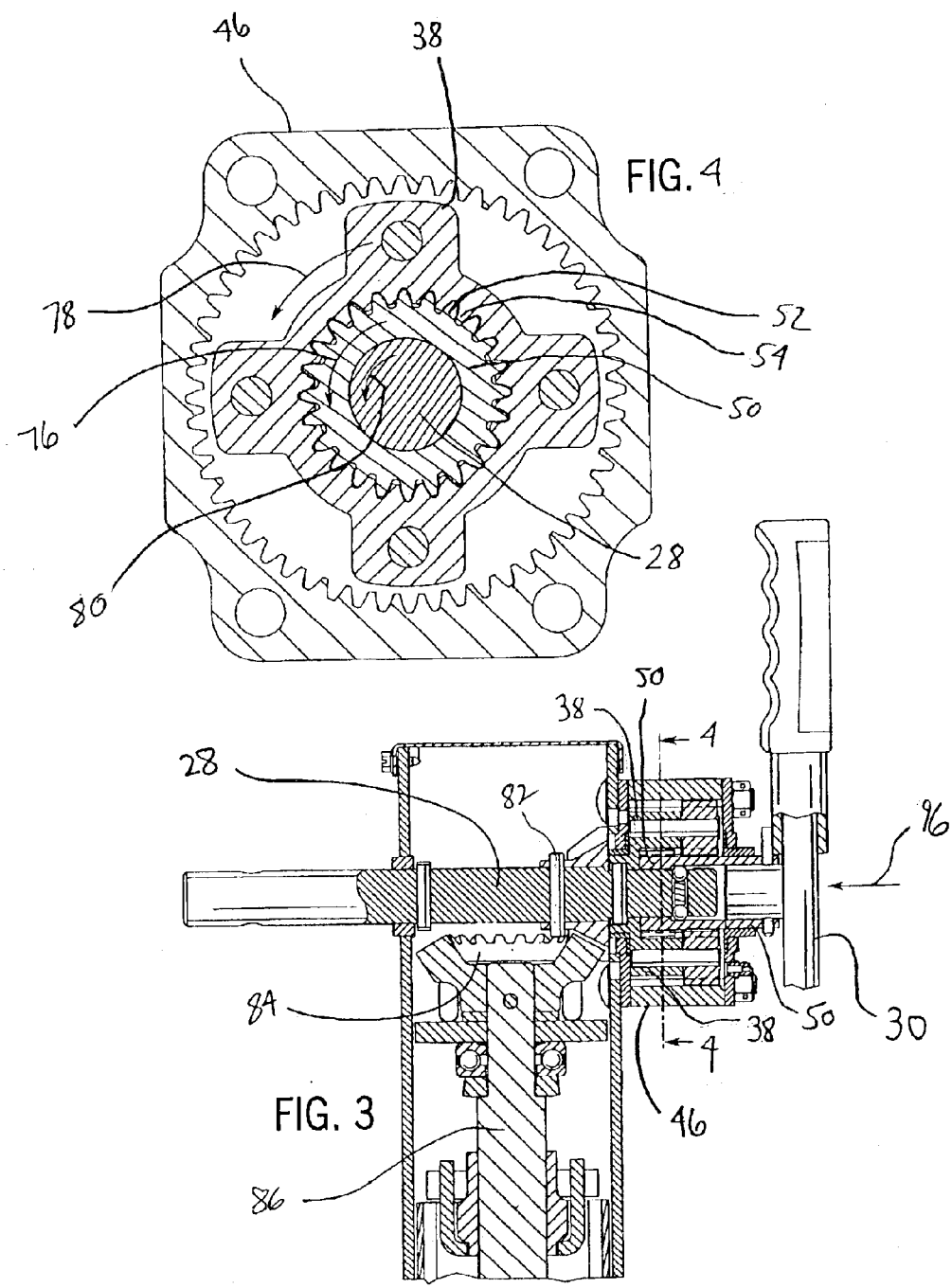

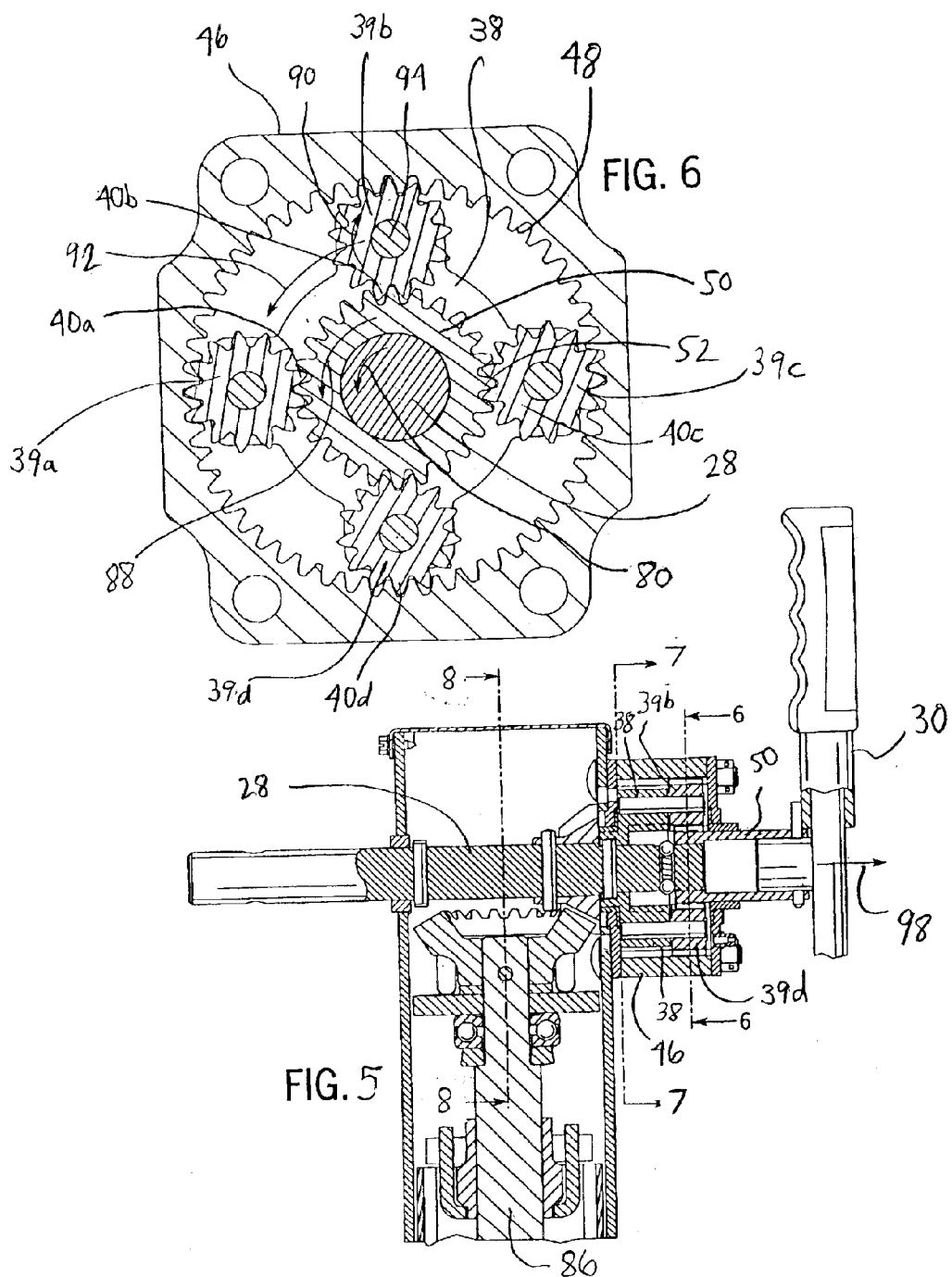

US 6,893,006 B2

MULTI-SPEED DROP LEG MECHANICAL JACK FOR USE WITH A TRAILER

FIELD AND BACKGROUND OF THE INVENTION

This invention relates generally to a multi-speed drop leg mechanical jack, and more particularly, to a multi-speed drop leg mechanical jack for use with a trailer.

In the mechanical jack industry, and specifically where mechanical jacks are used with trailers, there is a continuing need to have user-friendly jacks that provide a commercially valuable balance of jack speed, lifting and lowering capabilities, ease of cranking and overall performance for both loaded and unloaded trailers. In mechanical jacks these variables are best overcome by selecting the appropriate gears by which the mechanical jack will operate, as well as anticipating the type of trailer that will be used with the jack.

In many instances, it is desirable for mechanical jacks to have multiple gear ratios that not only have the capacity to handle relatively heavy loads, but also have the ability to handle small and midsize loads while maintaining sufficient and commercially acceptable cranking speeds without excessive force required.

In addition, it is oftentimes desirable to be able to quickly provide elongation of the mechanical jack, such as in a drop leg, where there is not any mechanical cranking required in order to have a significant amount of jack elongation or contraction in a short amount of time, such as at the beginning or completion of the lifting process.

Moreover, it is also desirable to provide an efficient way to change from one operating gear of the jack to another. To the extent that the operator of the jack can better use the crank of the jack to facilitate faster and smoother changes of operating gears, the crank will be considered to be advantageous. It is a continuing design goal to have a crank that facilitates operator use of the mechanical jack to which it is connected, in order to provide improved cranking and improved changing from one operating gear to another.

Therefore, it would be advantageous to have a mechanical jack typically used with trailers that has a functional combination of several working gears as well as a drop leg feature. It would be particularly desirable if the drop leg feature was considered when selecting the working gears of the jack. It would also be advantageous to have a crank or handle for use with a mechanical jack that assists in both effective raising and lowering of the jack, as well as efficient transition from one working gear to another.

BRIEF SUMMARY OF THE INVENTION

Disclosed herein is a multi-speed drop leg mechanical jack for use with a trailer. The jack comprises: an outer tubular housing; a inner tubular housing in mechanical engagement with the outer tubular housing, a drop leg in non-geared sliding engagement with the inner tubular housing; a gearbox mounted to the outer tubular housing, the gearbox comprising: a gear housing having an inner surface defined by gear housing teeth; a plurality of planet gears, each of the plurality of planet gears having teeth, the teeth in meshing engagement with the gear housing teeth; a planetary carrier connected to the plurality of planet gears, the carrier having an inner surface defined by planetary carrier teeth; and a sun gear having sun gear teeth, the sun gear axially slideable between a working high gear in which the sun gear teeth are in meshing engagement with the planetary carrier teeth and a working low gear in which the sun gear teeth are in meshing engagement with the teeth of the plurality of planetary gears.

In another embodiment, a gearbox for use as part of a multi-speed drop leg mechanical jack for use with a trailer is disclosed. The gearbox comprises: a gear housing having an inner surface defined by gear housing teeth; a plurality of planet gears, each of the plurality of planet gears having teeth, the teeth in meshing engagement with the gear housing teeth; a planetary carrier connected to the plurality of planet gears, the carrier having an inner surface defined by planetary carrier teeth; and a sun gear having sun gear teeth, the sun gear axially slideable between a working high gear in which the sun gear teeth are in meshing engagement with the planetary carrier teeth and a working low gear in which the sun gear teeth are in meshing engagement with the teeth of the plurality of planetary gears; wherein the working high gear and the working low gear each have a turns per inch (TPI) parameter and each of the TPI parameters are selected at least in part to complement the drop leg.

BRIEF DESCRIPTION OF THE DRAWINGS

The drawings illustrate the best mode presently contemplated for carrying out the invention.

In the drawings:

FIG. 1 is a schematic illustration of a multi-speed drop leg mechanical jack having a gearbox in accordance with one aspect of the present invention;

FIG. 1a is an exploded perspective view of the multi-speed jack gearbox;

FIG. 2 is a partial enlarged view of a handle for use with the multi-speed jack;

FIG. 3 is a side sectional view of a portion of the multi-speed jack showing the jack in a working high gear position;

FIG. 4 is a sectional view of a gearbox of the multi-speed jack taken along line 4—4 of FIG. 3;

FIG. 5 is a side sectional view of a portion of the multi-speed jack showing the jack in a working low gear position;

FIG. 6 is a sectional view of a gearbox of the multi-speed jack taken along line 6—6 of FIG. 5;

DETAILED DESCRIPTION OF THE INVENTION

Figure 7:
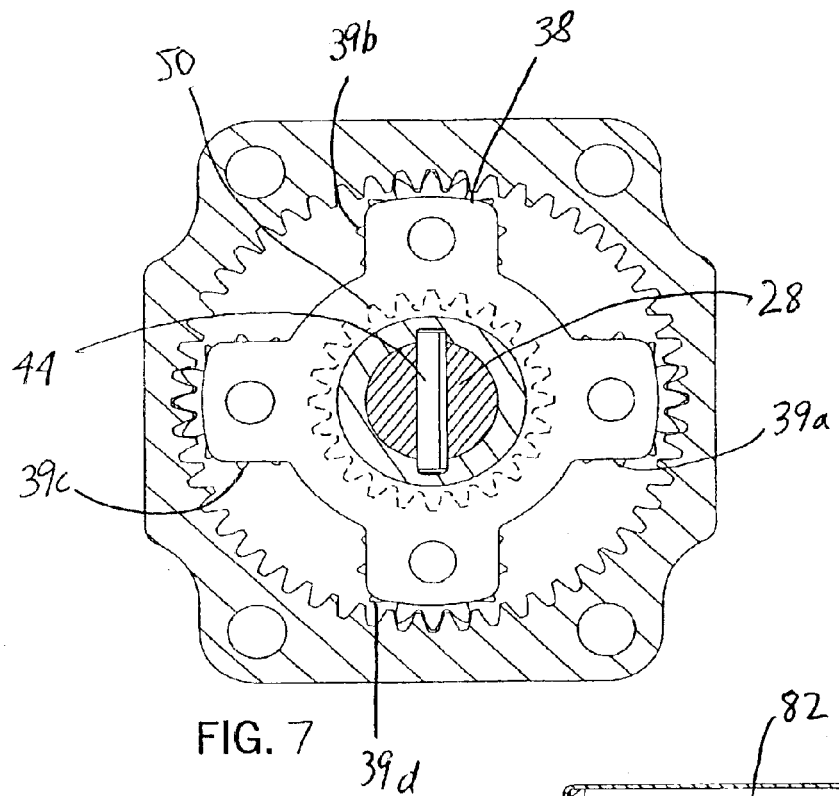
FIG. 7 is a sectional view of the gearbox taken along line 7—7 of FIG. 5.

Referring to FIG. 1, a schematic illustration of a multi-speed dropleg mechanical jack 10 having a gearbox 12 in accordance with one aspect of the present invention is shown. The jack 10 can be used with a trailer 14, partially shown FIG. 1. Trailers that are contemplated for use with the present invention include, but are not limited to, horse trailers, livestock trailers, large flatbed trailers, and construction equipment trailers.

The jack 10, in the embodiment shown, is generally a multi-speed mechanical jack incorporating a drop leg or "through the air" speed, and two geared working speeds, namely a working low gear speed that facilitates lifting of relatively higher loads, and a working high gear speed for faster lifting of relatively lower and medium-sized loads or lowering relatively high loads. As shown, gearbox 12 is connected, preferably so as to be flush mounted, to tubular housing 16 of jack 10. Alternatively, gearbox 12 may be mounted within tubular housing 16 so as to have an internal gearbox arrangement. Tubular housing 16 can generally be referred to as a "concentric" tubular style, and in a preferred embodiment, a concentric, triple tubular style housing can be used. Tubular housing includes telescoping tubular sections 18*a* and 18*b*. Jack 10 further includes drop leg 20. Drop leg 20 is in sliding, telescoping relationship tubular section 18*b*. Telescoping tubular sections 18*a*, 18*b* and 20 are supported by jack base 22. Tubular section 18*b* includes pin assembly 24 having pin 26. Pin 26 is used to fix drop leg 20 in position relative to tubular section 18*b*. Gearbox 12 is connected to shaft 28. Rotation of shaft 28 translates into linear movement of jack 10, and more particular, tubular section 18*b* relative to tubular section 18*a*, in order to raise and lower trailer 14. In one embodiment, jack 10 is fixedly connected to trailer 14, for example, via mounting tabs 27 (schematically shown in phantom) which can be secured to trailer channel 29 in a known fashion. The drop leg is used to move quickly between the fully retracted position of the jack and an extended position in which the jack base is in close proximity to the ground. The drop leg movement helps provide the necessary clearance for the trailer, to which the jack is attached.

Still referring to FIG. 1, crank 30, also termed a leveraging actuator (i.e., a handle), is used to impart rotation as well as translation to the shaft. Crank 30 includes two grips or handles 32, 34, which are separated by a contoured crank bar 36. The grips are used to facilitate the imparting of a balanced translational and/or rotation force (i.e., torque) to shaft 28 as needed. Contoured crank bar 36 is shown in a preferred "L"-type configuration, however, any suitable shape or contoured configurations are contemplated. For example, contoured crank bar 36 can be bent or otherwise shaped to facilitate an end user's use of crank 30.

FIG. 1*a* is an exploded perspective view of multi-speed jack gearbox 12. Gearbox 12 provides for the necessary engagement of the gears so as to impart motion of the shaft in two geared positions. Planetary carrier 38 carries planet gears 39*a–d*, having teeth 40*a–d* respectively, via connecting pins 42*a–d*, carrier 38, planet gears 39*a–d* and connecting pins 42*a–d* are positioned within gear housing 46, and more particularly, positioned such that teeth 40*a–d* are in meshing engagement with interior teeth 48 of the housing. Shaft 28 connects to planetary carrier 38 via pin 44. Sun gear 50 includes teeth 52 and, via the teeth, meshingly engages either teeth 40*a–d* of planet gears 39*a–d*, or alternatively, interior teeth 54 of planetary carrier 38, with these meshing engagements defining the two geared positions of gearbox 12. Rotation of sun gear 50 via crank 50 (FIGS. 1 and 2) imparts rotation and force transfer to shaft 28. Gearbox 12 further includes input bushing 56 and output bushing 58 and is enclosed by endplates or cover portions 60*a–b*. Securing means 62 (e.g., a carriage bolt) and 64 are to fasten (typically from inside) the gearbox together.

Referring to FIGS. 1–2, in a preferred embodiment, crank 30 is removable, as indicated by the phantom illustration (FIG. 1). Crank 30 includes connecting portion 65, which extends from crank bar 36, and slideably engages hollow sun gear shaft portion 28*a*. Pin 68 is secured to crank bar 36, and more particularly, to slideable crank bar portion 70. Both torque and translation forces are transmitted via pin 68 and holes 72*a* and 72*b* in connecting portion 65 and shaft portion 28*a* respectively. When it is desired to remove crank 30 from shaft 28, for example, during transport of trailer 14 (FIG. 1), the following is performed: a) raising slideable crank bar portion 70 of crank 30 in a direction indicated by arrow 66, which in turn raises pin 68 by clearing the pin from holes 72*a* and 72*b*, respectively; and b) sliding connecting portion 65 out of shaft portion 28*a*, or sungear 50, in a direction indicated by arrow 74 (i.e., axially along the shaft), thereby disengaging crank 30 from shaft 28 or sungear 50. To engage the crank with the shaft, the above procedure is reversed. In one embodiment, the jack includes a connecting device to connect the crank to the shaft or may be connected directly to sungear 50. The connecting device may include a spring-loaded detent (not shown) or other type of catch mechanism to secure the connecting device into position. In operation, when pin 68 is engaged, the detent emerges to lock or prevent movement of slideable crank bar portion 70, and the detent retreats inside slideable crank bar portion 70 when pin 68 is disengaged to permit movement of the slideable crank bar portion.

Turning to FIGS. 3–4, a side sectional view of a portion of the multi-speed jack showing the jack in a working high gear position, and a sectional view of a gearbox of the multi-speed jack taken along line 4—4 of FIG. 3 are shown, respectively. In the working high gear position, sun gear teeth 52 of sun gear 50 are in meshing engagement with planetary carrier teeth 54 of planetary carrier 38. Planetary carrier teeth 54 are formed to match the sun gear tooth form. In the working high gear position, sun gear 50 and planetary carrier 38 are disposed within gear housing 46. Sun gear 50 is driven by crank 30 to rotate, for example in a direction indicated by arrow 76, to drive planetary carrier 38, for example in a direction indicated by arrow 78. Planetary carrier 38, in turn, causes rotation of shaft 28, for example, in a direction indicated by arrow 80.

Turning to FIGS. 5–6, a side sectional view of a portion of the multi-speed jack showing the jack in a working low gear position, and a sectional view of a gearbox of the multi-speed jack taken along line 6—6 of FIG. 5 are shown, respectively. In the working low gear position, sun gear teeth 52 of sun gear 50 are in meshing engagement with planet gear teeth 40*a–d* of planet gears 39*a–d*. In the working low gear position, sun gear 50, planetary gears 39*a–d*, and planetary carrier 38 are disposed within gear housing 46. Sun gear 50 is again driven by crank 30 to rotate, for example in a direction indicated by arrow 88, and drive planet gears 39*a–d*, for example in a direction indicated by arrow 90. In addition, planet gear teeth 40*a–d* of planet gears 39*a–d* meshingly engage housing interior teeth 48 of housing 46, and thus, as planet gears 39*a–d* rotate in the direction indicated by arrow 90, the planet gears also revolve in a direction indicated by arrow 92. Planet gears 39*a–d* are connected, for example via pin 94 as shown, to planetary carrier 38. Thus, as planet gears 39*a–d* rotate and revolve, planetary carrier 38 is itself carried in the direction indicated by arrow 92. Planetary carrier 38 causes rotation of shaft 28, for example, in a direction indicated by arrow 80. It is noted that this gearing arrangement rotates shaft 28 in the same direction as crank 30 in both geared positions. Such an arrangement may tend to decrease novice operator confusion and directional errors when switching gears.

As shown in FIGS. 3 and 5, crank 30 is used to shift between the working high gear position and the working low gear position. More particularly, a jack user can push or pull on crank 30 to move the crank in directions indicated by arrows 96 and 98. Since crank 30 is connected, for example via pin 68 (FIG. 2) to shaft 28 or sun gear 50, the sun gear axially slides between the working high gear position (FIG. 4), in which sun gear teeth 52 are in meshing engagement with planetary carrier teeth 54 and the working low gear position (FIG. 6), in which the sun gear teeth are in meshing engagement with planet gear teeth 40a–d of planet gears 39a–d.

Turning to FIG. 1, crank 30 can be termed a "low friction" crank in that it minimizes frictional losses when shifting between the working high gear position and the working low gear position by providing, via handles 32, 34, balanced exertion forces on shaft 28.

FIG. 7 is a sectional view of the gearbox taken along line 7—7 of FIG. 5. As shown, connector 44, for example a pin connector, connects planetary carrier 38 with shaft 28. In the working low gear position shown, sun gear 50 (shown in phantom) causes, via planet gears 39a–d, rotation of carrier 38, in turn rotating shaft 28.

Figure 8:
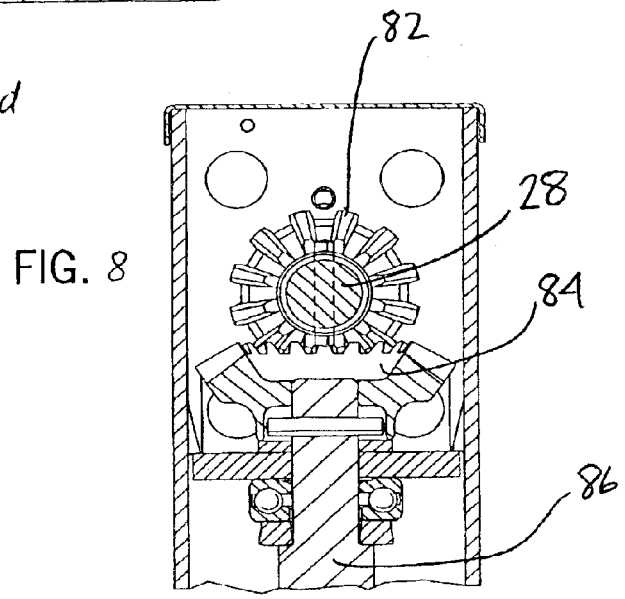
FIG. 8 is a sectional view of a portion of the multi-speed jack taken along line 8—8 of FIG. 5.

FIG. 8 is a sectional view of a portion of the multi-speed jack taken along line 8—8 of FIG. 5. As shown, gear 82 is connected to shaft 28 and is in meshing engagement with crown gear 84, with the crown gear in turn connected to jack shaft 86. In a known manner, rotation of shaft 28 causes linear displacement of jack shaft 86, via crown gear 84, to raise and lower jack 10.

In the working high gear, preferably between about 7 turns and 11 turns, and more preferably about 9 turns, of sun gear 50 (FIGS. 3–4) results in about one inch of linear displacement of jack shaft 86 (FIGS. 3–4, 8), with this relationship generally referred to as "turns per inch" or TPI. In one preferred embodiment, the working high gear raises loads that range from about 2,500 lbs to about 4,500 lbs and lowers loads that range from about 4,200 lbs to about 7,500 lbs. In the working high gear, one (1) revolution of sun gear 50 results in one (1) revolution of planetary carrier 38 (FIGS. 3–4).

The working low gear, preferably results in between about 24 and 30, and more preferably about 27.75 TPI. In one preferred embodiment, the working low gear raises loads that range from about 4,500 lbs to about 10,000 lbs and lowers loads from about 7,500 lbs and above. In the working low gear position, three (3) revolutions of sun gear 50 results in one (1) revolution of planetary carrier 38 (FIGS. 5–6).

Accordingly, the ratio of the working low gear to the working high gear, termed the "working low gear-to-working high gear ratio" is preferably between about 2.4 to 1 and 5 to 1, more preferably about 3 to 1, and even more preferably about 3.1 to 1. In one preferred embodiment, the gear ratio is 3.0833 to 1.

Typically the working low gear ratio (or mechanical advantage) is chosen based on a maximum lifting load. The working high gear ratio, in contrast, is chosen based on speed. In the present invention, both the working low gear and working high ratios are selected for use specifically with the jack drop leg feature. Because the drop leg provides the through-the-air function, the typical speed consideration becomes unimportant; therefore the working high gear ratio can be chosen based on raising or lowering significant but less than maximum loads. The user is therefore not confined to lift and lower all loads with only the working low gear, especially important when the size of the load is very small.

The design of the gear ratios can take into account the fact that the drop leg is available, and as part of the design criterion, the working high gear and the gear ratios can be selected to carry a significant load. As a result, designing the working gears with the drop leg in mind eliminates high working gears that have to carry no load. Also, the gears can be operator selected to lift various loaded trailers with as much speed as possible. The overall efficiency is increased by reducing the time to raise and lower the jack in the loading conditions for which it is made. The two working gears plus drop leg design model is particularly desired when the loads change from fully loaded to unloaded, and where loading and unloading occurs frequently, such as in vehicle or animal trailers. The working high gear and the working low gear each have a turns per inch (TPI) parameter and each of the TPI parameters are selected at least in part to complement the drop leg. By "complement" it is mean that the TPI parameters are selected based on the anticipation of the availability of the drop leg.

The present invention has been described in terms of preferred embodiments. Equivalents, alternatives, and modifications, aside from those expressly stated herein, are possible and should be understood to be within the scope of the appending claims.

What is claimed is:

1. A multi-speed drop leg mechanical jack for use with a trailer, the jack comprising:

first and second housing seections telescopically moveable relative to each other, said first housing section connected to said trailer to be raised or lowered;

a drop leg in non-geared sliding engagement with said second housing section and selectively engageable therewith along a range of telescopic positions so as to be engagable with the ground;

a drive mechanism for creating telescopic movement between said first and second housing sections so as to raise or lower said object relative to the ground;

a gearbox mounted to said first housing section, the gearbox comprising:

a gear housing having an inner surface defined by gear housing teeth;

a plurality of planet gears, each of the plurality of planet gears having teeth, the teeth in meshing engagement with the gear housing teeth;

a planetary carrier connected to the plurality of planet gears, the carrier having an inner surface defined by planetary carrier teeth;

a sun gear having sun gear teeth, the sun gear axially slideable between a working high gear in which the sun gear teeth are in meshing engagement with the planetary carrier teeth and a working low gear in which the sun gear teeth are in meshing engagement with the teeth of the plurality of planetary gears wherein the working high gear and the working low gear each have a turns per inch (TPI) parameter and each of the TPI parameters is selected at least in part to complement the drop leg; and wherein said drive mechanism utilizes said gearbox to provide said working high gear or said working low gear to support loads encountered during the raising or lowering said trailer.

2. The multi-speed drop leg mechanical jack of claim 1 wherein the planetary carrier is connected to a shaft, and the shaft is in geared relationship with a jack shaft for raising and lowering the jack.

3. The multi-speed drop leg mechanical jack of claim 2, wherein the TPI parameter is defined as a number of turns of the sun gear relative to a linear displacement of the jack shaft.

4. The multi-speed drop leg mechanical jack of claim 3 wherein the TPI parameter for working high gear is about 9 TPI.

5. The multi-speed drop leg mechanical jack of claim 3 wherein the TPI parameter for the working low gear is about 27.75 TPI.

6. The multi-speed drop leg mechanical jack of claim 1 wherein a working low gear-to-working high gear ratio ranges from about 2.4 to 1 to about 5 to 1.

7. The multi-speed drop leg mechanical jack of claim 3 wherein the TPI parameter for the working high gear is in a range from about 7 to about 11 TPI.

8. The multi-speed drop leg mechanical jack of claim 3 wherein the TPI parameter for the working low gear is in a range from about 24 to about 30 TPI.

9. The multi-speed drop leg mechanical jack of claim 3 further including a crank and wherein the crank is used to shift the axially slideable sun gear between the working high and the working low gears.

10. The multi-speed drop leg mechanical jack of claim 2 wherein, in the working high gear, one revolution of the sun gear results in one revolution of the shaft.

11. The multi-speed drop leg mechanical jack of claim 2 wherein, in the working low gear, three revolutions of the sun gear results in one revolution of the shaft.

12. The multi-speed drop leg mechanical jack of claim 1 wherein a working low gear-to-working high gear ratio is 3.0833 to 1.

13. A multi-speed mechanical jack for raising and lowering an object, said jack comprising:

first and second housing sections telescopically moveable relative to each other, said first housing section connected to said object to be raised or lowered;

a drop leg telescopically moveable relative to said second housing section and selectively engagable therewith along a range of telescopic positions so as to be engagable with the ground;

a drive mechanism for creating telescopic movement between said first and second housing sections so as to raise or lower said object relative to the ground; and a gear mechanism that engages said drive mechanism, said gear mechanism being selectable between at least two working gears that can support loads encountered during the raising or lowering of said object.

14. The multi-speed mechanical jack of claim 13 wherein said at least two working gears comprise a working low gear and a working high gear.

15. The multi-speed mechanical jack of claim 14 wherein said drive mechanism comprises:

a threaded screw held within said first tube section;

a fixed nut mounted within said second housing section; and wherein said threaded screw threadedly engages said fixed nut to provide telescopic movement of said first housing member relative to said second housing member during threaded movement of said threaded screw through said fixed nut.

16. The multi-speed mechanical jack of claim 15 wherein said gear mechanism comprises a planetary gear set.

17. The multi-speed mechanical jack of claim 16 wherein said planetary gear set comprises:

a gear housing having an inner surface defined by gear housing teeth;

a plurality of planet gears, each of the plurality of planet gears having teeth, the teeth in meshing engagement with the gear housing teeth;

a planetary carrier connected to the plurality of planet gears, the carrier having an inner surface defined by planetary carrier teeth; and a sun gear having sun gear teeth, the sun gear axially slideable between a working high gear in which the sun gear teeth are in meshing engagement with the planetary carrier teeth and a working low gear in which the sun gear teeth are in meshing engagement with the teeth of the plurality of planetary gears.

18. The multi-speed mechanical jack of claim 17 wherein the planetary carrier is connected to a shaft, and the shaft is in geared relationship with said threaded screw for raising or lowering said object.

19. The multi-speed mechanical jack of claim 18 further comprising a crank connected to said sun gear wherein said crank is used to shift the axially slideable sun gear between the working high and the working low gears.

20. The multi-speed mechanical jack of claim 19 wherein said object is a trailer.

21. In a multi-speed mechanical jack for raising and lowering an object and having first and second housing sections telescopically moveable relative to each other, said first housing section connected to said object to be raised or lowered, a drop leg telescopically moveable relative to said second housing section and selectively engagable therewith along a range of telescopic positions so as to be engagable with the ground, a drive mechanism for creating telescopic movement between said first and second housing sections so as to raise or lower said object relative to the ground, the improvement comprising:

a gear mechanism that engages said drive mechanism, said gear mechanism being selectable between at least two working gears that can support loads encountered during the raising or lowering of said object.

* * * * *